US006130677A

United States Patent [19]
Kunz

[11] Patent Number: 6,130,677
[45] Date of Patent: Oct. 10, 2000

[54] INTERACTIVE COMPUTER VISION SYSTEM

[75] Inventor: Andrew Kunz, Palo Alto, Calif.

[73] Assignee: Electric Planet, Inc., Palo Alto, Calif.

[21] Appl. No.: 08/943,681

[22] Filed: Oct. 15, 1997

[51] Int. Cl.[7] .................................. G06T 15/70
[52] U.S. Cl. ...................... 345/435; 382/173; 382/174; 382/171; 382/164; 382/282; 382/309
[58] Field of Search .................................. 345/435, 114, 345/473, 474, 475, 524, 433; 348/112; 382/173, 174, 171, 164, 282, 309

[56] References Cited

U.S. PATENT DOCUMENTS

| | | | |
|---|---|---|---|
| 4,843,568 | 6/1989 | Krueger et al. | 364/518 |
| 5,631,697 | 5/1997 | Nishimura et al. | 348/172 |
| 5,767,867 | 6/1998 | Hu | 345/524 |
| 5,781,198 | 7/1998 | Korn | 345/435 |
| 5,790,124 | 8/1998 | Fischer et al. | 345/435 |

OTHER PUBLICATIONS

"Virtual Sets" RT–SET, Ltd. (Real Time Synthesized Entertainment Technology), Herzelia, Israel, Updated Dec., 1995.

*Primary Examiner*—Mark K. Zimmerman
*Assistant Examiner*—Kimbinh T. Nguyen
*Attorney, Agent, or Firm*—Hickman Stephens Coleman & Hughes, LLP

[57] ABSTRACT

A system and method for permitting a subject to interact with an electronic image. In one embodiment, the present invention obtains a first electronic image of a scene including the subject. An alpha image of the subject is generated. From the alpha image a characteristic of the subject is determined. The first characteristic is compared against a control box. The correlation between the first characteristic and the control box controls the interaction between the subject and the first electronic image. In another embodiment, the subject interacts with a second electronic image that is different from the first electronic image. In another embodiment, the interaction between the subject and the electronic image is the control of a cartoon character added to the electronic image. In a further embodiment, the cartoon character changes its appearance based upon the characteristic of the subject.

15 Claims, 12 Drawing Sheets

INTERACTIVE COMPUTER VISION SYSTEM

CROSS REFERENCE TO RELATED APPLICATIONS

U.S. patent application Ser. No. 08/951,889, entitled "METHOD AND APPARATUS FOR MODEL-BASED COMPOSITING", by Subutai Ahmad, Attorney Docket No. ELECP001, filed concurrently herewith; U.S. application Ser. No. 09/174,491, entitled "METHOD AND APPARATUS FOR PERFORMING A CLEAN BACKGROUND SUBTRACTION", by Jeffrey L. Edwards and Kevin L. Hunter, Attorney Docket No. ELECP003A, filed concurrently herewith; and U.S. patent application Ser. No. 08/950,904, entitled "A COMPUTER VISION SYSTEM FOR SUBJECT CHARACTERIZATION", by Subutai Ahmad and Kevin L. Hunter, Attorney Docket No. ELECP007, filed concurrently herewith, all assigned to Electric Planet, Inc., are incorporated herein by reference in their entirety.

BACKGROUND OF THE INVENTION

The present invention relates to computer vision systems. More particularly, the present invention relates to an improved apparatus and method for determining the characteristics of an articulated member.

Computer vision is a development in the broader field of computer systems. One of the goals of computer vision systems is to recognize objects from electronic images. For example, a video camera may record a single image or a series of images and relay the information to a computer system. The computer system may then be able to determine the relative position of objects, persons, animals or any other images within the computer image.

Several types of applications exist for computer vision systems. By way of example, in industrial applications, a computer vision system may be utilized to monitor and control a robotic arm used in a fabrication system. Computer vision systems may also be used for pattern recognition purposes, manufacturing quality control, motion analysis and security.

FIG. 1 illustrates a typical scene 2 that a computer vision system may be used to analyze. Scene 2 may include a subject 4 and a background 5. Subject 4 can be any object which the computer vision system may be used to analyze. By way of example, in the illustrated example, subject 4 is a person. Background 5 may include any part of scene 2 that is not part of subject 4. In the illustrated example, scene 5 includes the sun, clouds, the sky and hills.

FIG. 2 illustrates an electronic image 10 derived from scene 2 of FIG. 1. Electronic image 10 may include an electronic representation of the background 25, and an electronic representation of subject 4, subject image 20. Typically, computer vision systems are concerned with various aspects of subject 4 by way of subject image 20. In the illustrated example, several features of subject 20 are enumerated 20a through 20h. By way of example, the enumerated features may include a center of body point 20a, a body box 20b, a head box 20c, an arm box 20d, a forearm box 20e, a hand point 20f, an elbow point 20f, and a shoulder point 20h. However, in general, any type of suitable characteristic of subject 20 may be desired to be obtained through the computer vision system.

Another focus of computer vision systems has been on the ability to interact with electronic image 10. By way of example, computer vision systems may be used to control a machine based upon the movements or position of subject 4. Alternately, electronic image 10 and subject image 20 may be may be manipulated by subject 4 through movement.

Real time interaction has also been attempted by prior art systems. However, interaction between subject 4 and the computer vision system may also run into the limitations of precise subject characterization and real-time operations. Prior art systems that may have allowed real-time interaction between a subject and a computer vision system typically require large amounts of computational power.

As will be discussed in more detail below, the prior art methods of determining the characteristics of subject image 20, are often times complex and unable to be accomplished in real time. For example, one method of subject characterization is through the use of stereo vision. In stereo vision, two cameras are used to capture the electronic images of subject 4. One advantage of the stereo vision method is that a 2-D or a 3-D image may be generated.

However, problems exist with registration in systems which use stereo vision. That is, it is often difficult to match the two images captured by the separate video cameras to create a coherent single image. The registration problem, often leads to faulty characterization of subject image 20. Additionally, the use of two cameras adds to the expense and complexity of the computer vision system. Further, stereo vision systems are typically not capable of characterizing subject image 20 in real time.

Another method of subject characterization is through the use of markers. Typically, markers are placed at various points on a subject that the computer vision system would like to detect. In the illustrated example, markers may be placed on shoulder point 20h, elbow point 20g, hand point 20f, and center point 20a. The marker system may allow for real time characterization of subject image 20, however, there are several disadvantages.

The primary disadvantage associated with markers is that markers must be placed on subject 4 of FIG. 1 in order to obtain the various characteristics of subject image 20. The physical placement of markers is often not possible in situations where subject characterization is desired of objects not suitable for marking. For example, subject characterization may be desired of an animal in the wild. In such a case, markers cannot be placed on the wild animal.

Another disadvantage lies in the fact that subject 4 must physically wear the markers. There may be a number of situations where the subject is not capable or does not desire to wear markers, therefore, making subject characterization difficult. Additionally, the marker system may not be capable of obtaining all of the desired characteristics of subject 4. For example, body box 20b, head box 20a, arm box 20d, and forearm box 20e are two-dimensional shapes which may require a large number of markers in order to adequately characterize through computer vision. Once again, increasing the number of markers only adds to the difficulty and burden of using the marker system.

Another method of subject characterization using computer vision is to perform pretraining. A computer vision system may be used to preliminarily take and analyze electronic images of subject 4 before the actual subject characterization takes place in a real life situation. In this method, the computer vision system may be able to more accurately characterize subject image 20 in a real life situation. However, this assumes that subject 4 is available for pretraining. If subject 4 is a wild animal or another subject that is not available for pretraining, this method of subject characterization may not be feasible. Further, the change in conditions between the training setting and the real life setting may diminish any benefit derived from pretraining.

This assumes that the prior art systems are even capable of accurately capturing a subject image. To further distinguish the different points or parts of subject image 20 prior art systems may repetitively compare the current subject image 20 with all the possible sizes, shapes and positions subject 4 may be in. Typically, this exhaustive approach is generally incapable of producing real-time results.

As discussed, prior art systems, including the marker system and the pretraining system, may not be feasible in real life situations. However, other systems that do not utilize markers or pretraining may not capable of real time operations because of the extensive amount of computations needed to accomplish subject characterization. Typically, prior art systems use exhaustive algorithms to determine the desired characteristics of subject image 20.

Some prior art computer vision systems have been capable of interaction between subject 4 and electronic image 10. However, real time interaction between subject 4 and the computer vision system have continued to run into the problem of requiring extremely large amounts of computational power.

Thus, what is desired is a more efficient interactive computer vision system. A computer vision system that is capable of providing real-time interaction with the computational power of common computer systems is further desired.

SUMMARY OF THE INVENTION

To achieve the foregoing and other objects and in accordance with the purpose of the present invention, methods and apparatuses for permitting a subject to interact with an electronic image are disclosed.

In one embodiment of the present invention, the present invention obtains a first electronic image of a scene including the subject. An alpha image of the subject is generated. From the alpha image a first characteristic of the subject is determined. The first characteristic is compared against a control box. The correlation between the first characteristic and the control box controls the interaction between the subject and the first electronic image. In another embodiment, the subject interacts with a second electronic image that is different from the first electronic image.

In another embodiment, the interaction between the subject and the electronic image is the control of a cartoon character added to the electronic image. In a further embodiment, the cartoon character changes its appearance based upon the characteristic of the subject.

In yet another embodiment, a control box is automatically adjusted to conform to a subject. In a further embodiment, the control box is sized and located relative to the alpha image of the subject according to a characteristic of the subject.

The use of characteristics generated from an alpha image, which are indicative of the subject, greatly reduces the amount of computational power needed to provide an interactive computer vision system in accordance with the present invention. By reducing the amount of necessary computation, the present invention allows for real-time interaction. Additionally, hot boxes allows the subject to visually interact with the computer vision system in real-time, in one embodiment. Also, hot boxes provide a full spectrum of interactivity, in addition to discrete points of interaction. Thus, the present invention is thought to possess great advantages over the prior art. These and other features and advantages of the present invention will be presented in more detail in the following specification of the invention and the figures.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

An invention is described for improved interaction between a subject and a computer vision system. More particularly, the present invention may be implemented in a typical desktop computer system rather than large mainframes or supercomputers. Further, the present invention is capable of providing real-time interaction between the subject and the computer vision system.

Typically, real-time interaction capability initially requires the capture and characterization of the subject. Methods and apparatuses for real-time subject characterization are described in detail in co-pending U.S. patent application Ser. No. 08/950,404, entitled "A COMPUTER VISION SYSTEM FOR SUBJECT CHARACTERIZATION", filed concurrently herewith, which is incorporated herein by reference in its entirety.

Figure 1:
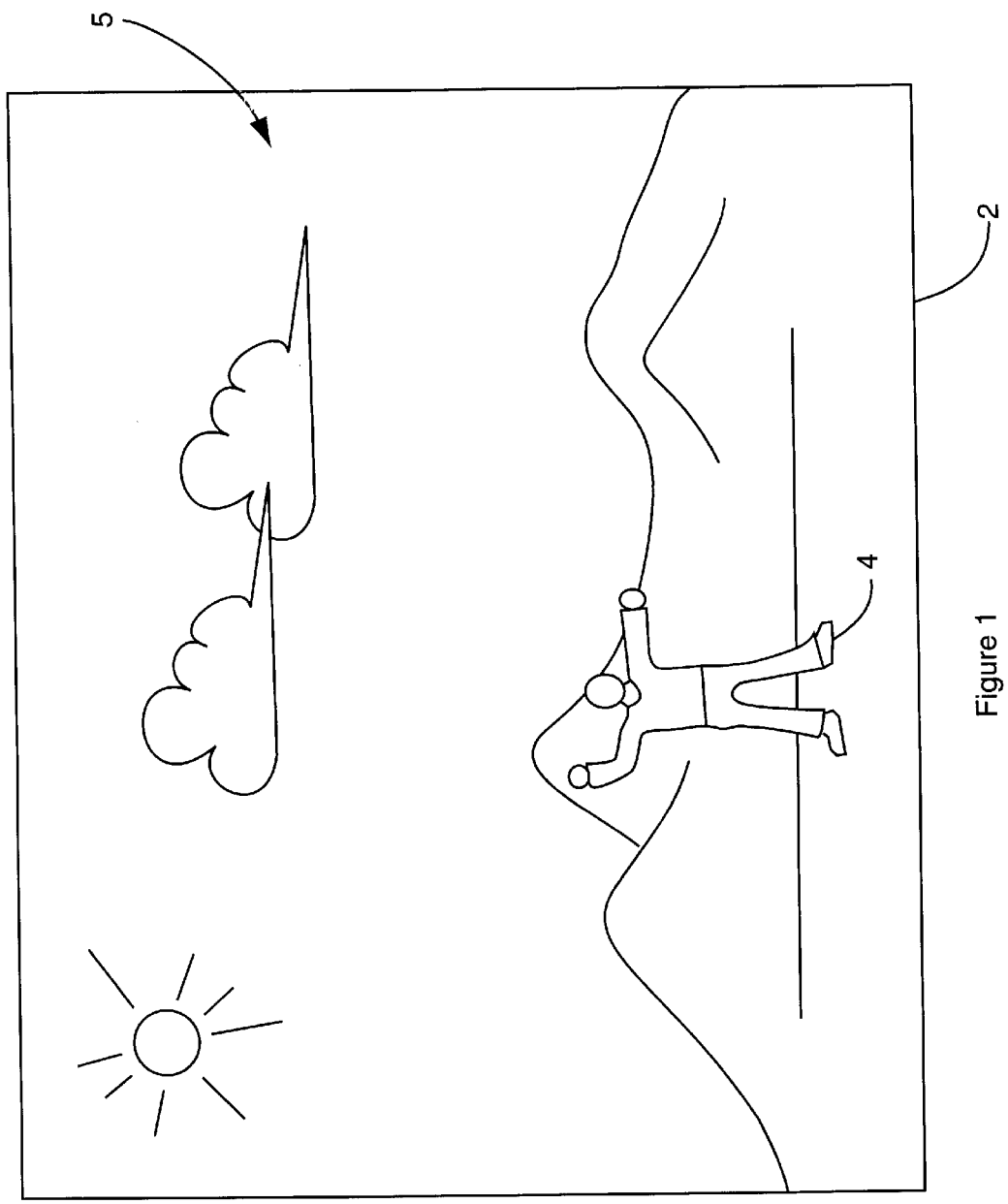
FIG. 1 illustrates a typical scene that a computer vision system may be used to analyze.
Figure 2:
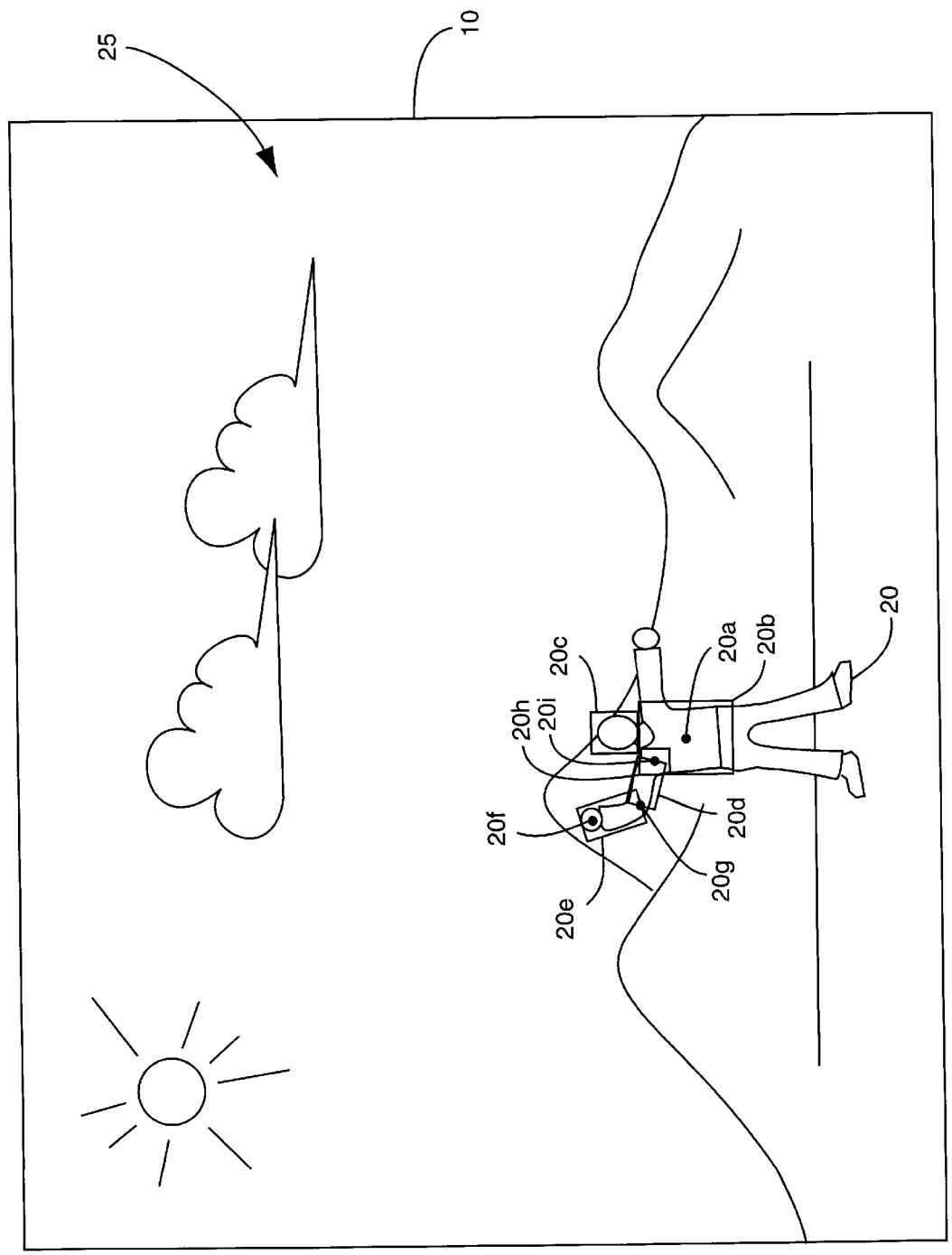
FIG. 2 illustrates an electronic image derived from the scene of FIG. 1.
Figure 3:
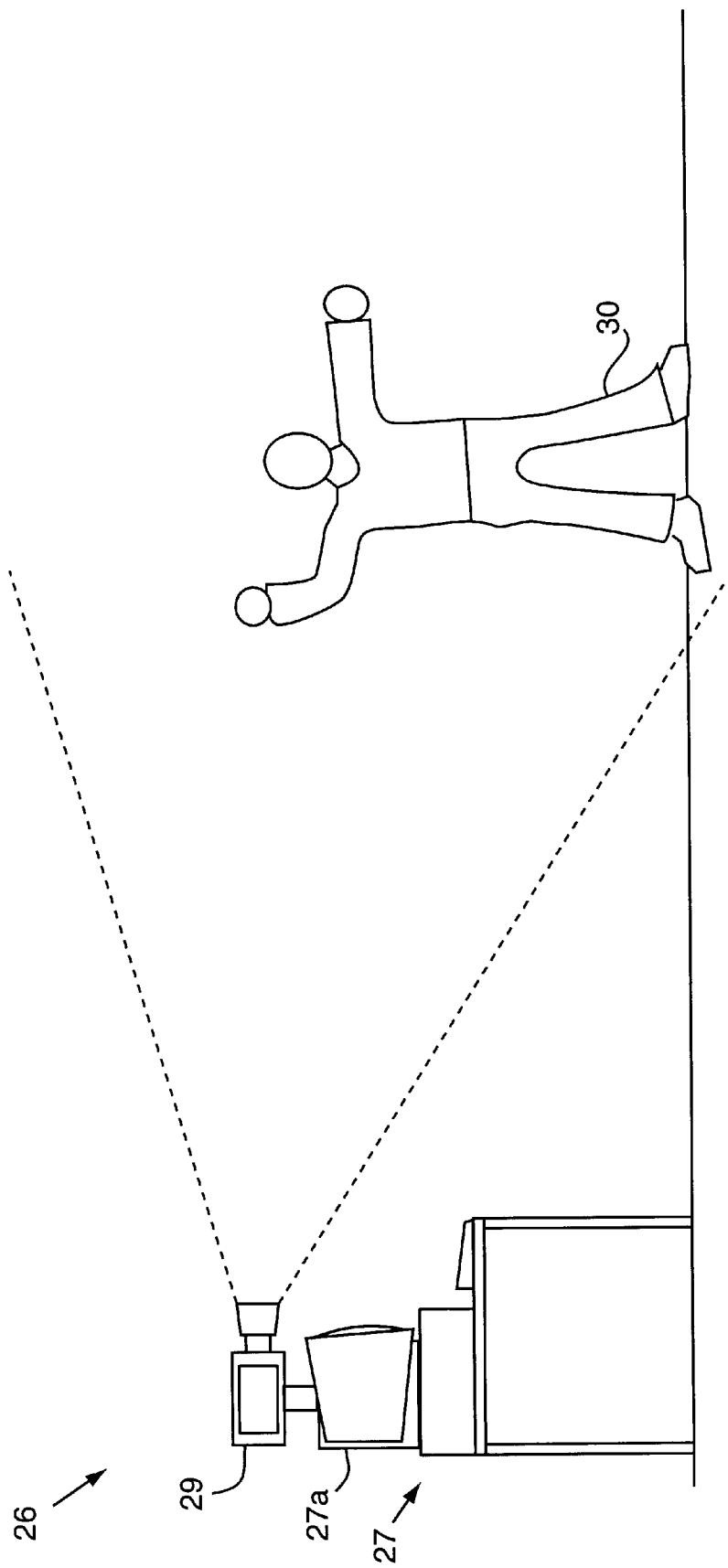
FIG. 3 illustrates a computer vision system in accordance with one embodiment of the present invention.

FIG. 3 illustrates a computer vision system 26 in accordance with one embodiment of the present invention. Computer vision system 26 typically includes a computer system 27, including a monitor 27a, and a camera 29. Computer system 27 may be any suitable type of computing device. By way of example, computer system 27 may include a stand-alone personal computer, a computer connected to a network, or a terminal connected to a larger computing device. However, due to the advantages of the present invention, a typical desktop computer utilizing an Intel 133 MHz Pentium® microprocessor is particularly suitable for use in accordance with the present invention.

Camera 29 may be any type of device that is capable of generating a visual image. Camera 29 includes, but is not limited to, a device capable of capturing a real life image and converting it to an electronic image. In other words, Camera 29 may be a digital video camera. Any combination of devices may be utilized in accordance with the present invention, as long as a two-dimensional representation of a subject may be obtained. By way of example, an analog camera in combination with a D/A converter, a discrete digital camera, a scanner, an infra-red camera, radar or sonar may be utilized.

Camera 29 is typically directed at a subject 30, to capture an electronic image of subject 30. Subject 30 may generally be any suitable subject desired to be characterized. By way of example, subject 30 may be a person, an animal, a robotic arm, an insect, or substantially any other type of multi-segmented living thing or animated object.

Figure 4:
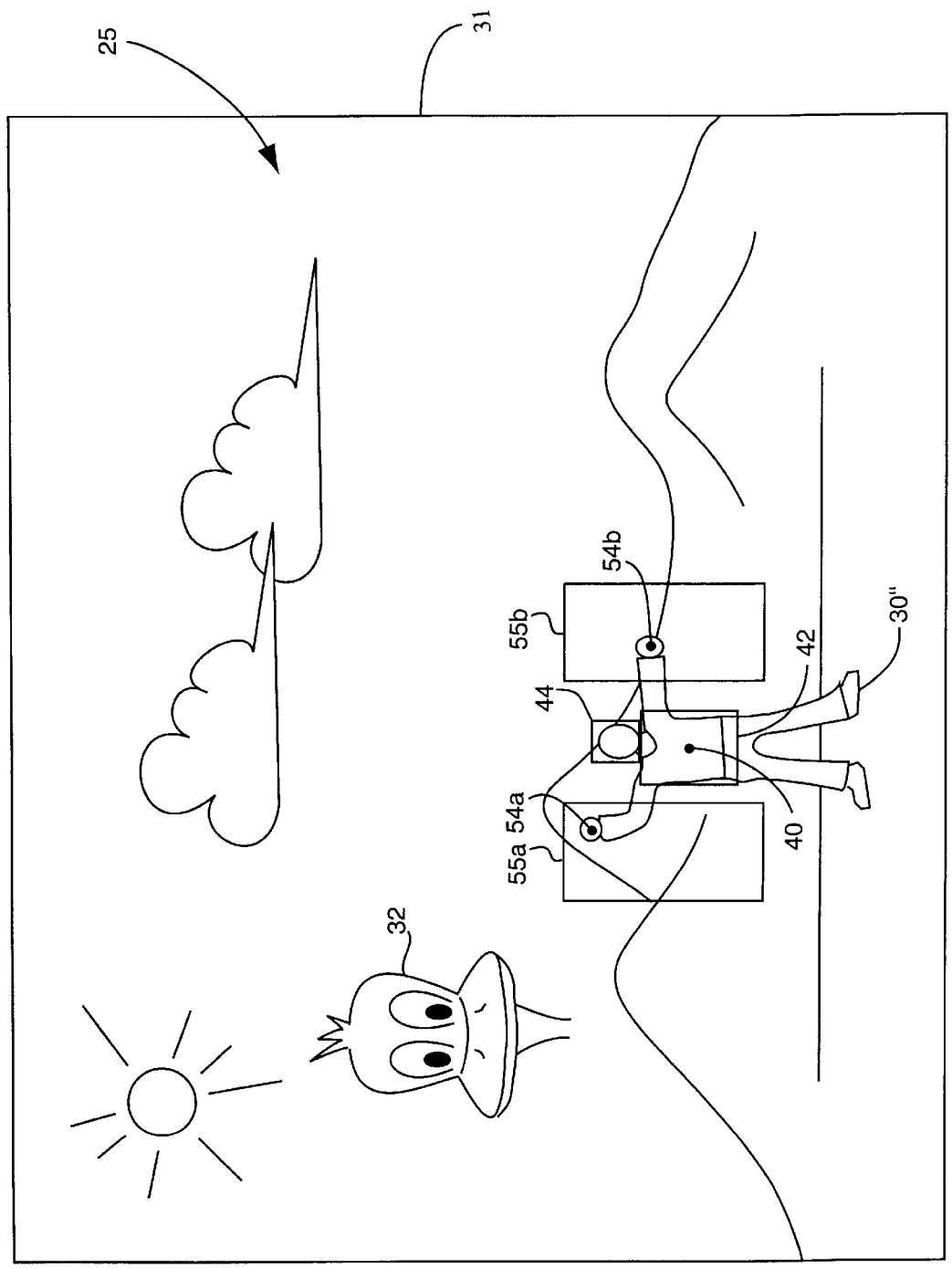
FIG. 4 illustrates an electronic image of the subject of FIG. 3, in accordance with one embodiment of the present invention.

FIG. 4 illustrates an electronic image 31 of subject 30 in FIG. 3, in accordance with one embodiment of the present invention. Image 31 includes a representation of a background 28, which may have been captured along with subject 30. Image 10 also includes an electronic representation of subject 30 as subject image 30" and an added image, e.g., cartoon character 32. Cartoon character 32 is typically generated by computer vision system 26. The actions, shape, and overall characteristics of cartoon character 32 may be controlled by the actions of subject 30, as represented by image 30".

In one embodiment of the present invention, the location of the hands of subject 30 may control the characteristics of cartoon character 32. By way of example, subject image 30" may include a center of body point 40, body box 42, head box 44, and hand points 54a and 54b, indicating the location of the various parts of subject image 30" within image 10. Electronic image 31 may also include hot boxes 55a and 55b, which may or may not be displayed. By determining the position of hand points 54a and 54b within hot boxes 55a and 55b computer vision system 26 may control the appearance of cartoon character 32.

Figure 5:
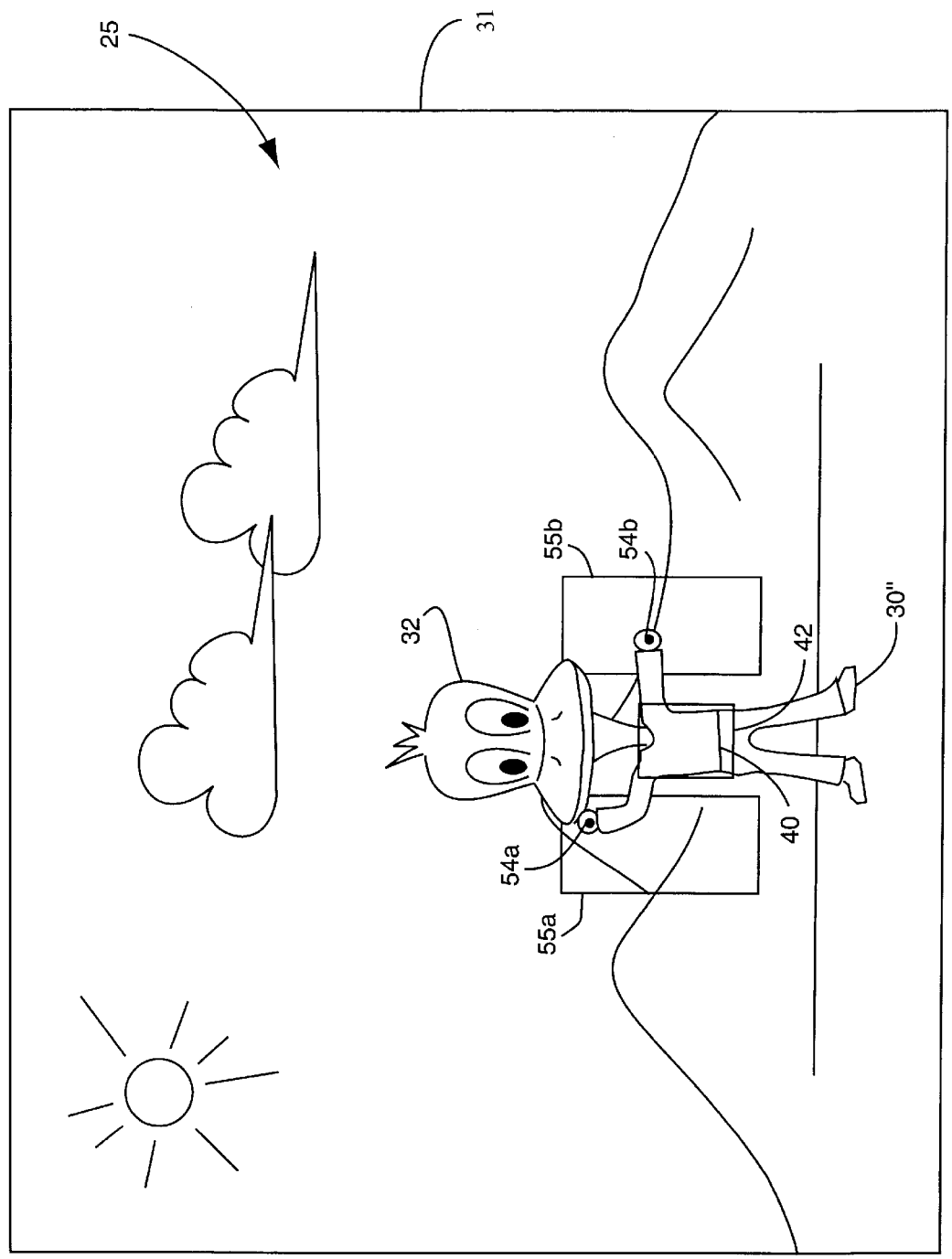
FIG. 5 illustrates an electronic image of the subject of FIG. 3, in accordance with another embodiment of the present invention.

FIG. 5 illustrates an electronic image 10 of subject 30 in FIG. 3, in accordance with another embodiment of the present invention. Instead of cartoon character 32 being distinct from subject image 30" cartoon character 32 may be placed over a part or all of subject image 30". By way of example, cartoon character 32 may be placed over the head of subject image 30". Subject 30 may then move its hands, thereby moving hand points 54a and 54b within hot boxes 55a and 55b, to affect the appearance of cartoon character 32.

Any suitable part of subject image 30" may generally be replaced by a cartoon character. By way of example, the hands, feet, arms, legs, or torso of subject image 30" may be cartoonified in accordance with the present invention. Entire subject image 30" may also be cartoonified. Further, any type of movement or position of the various parts of subject 30 may be used to control cartoon character 32. By way of example, a particular movement of subject 30, location of a specific part of subject 30, as well of different sizes and types of hot boxes 55a and 55b, may control the appearance of cartoon character 32.

Also, it should be appreciated that substantially any suitable cartoon image 32 may be used to cartoonify the actions of subject 30. Cartoon image 32 may range from a realistic image of subject 30 to an absurd cartoon character super-imposed on a part or all of subject image 30".

Figure 6:
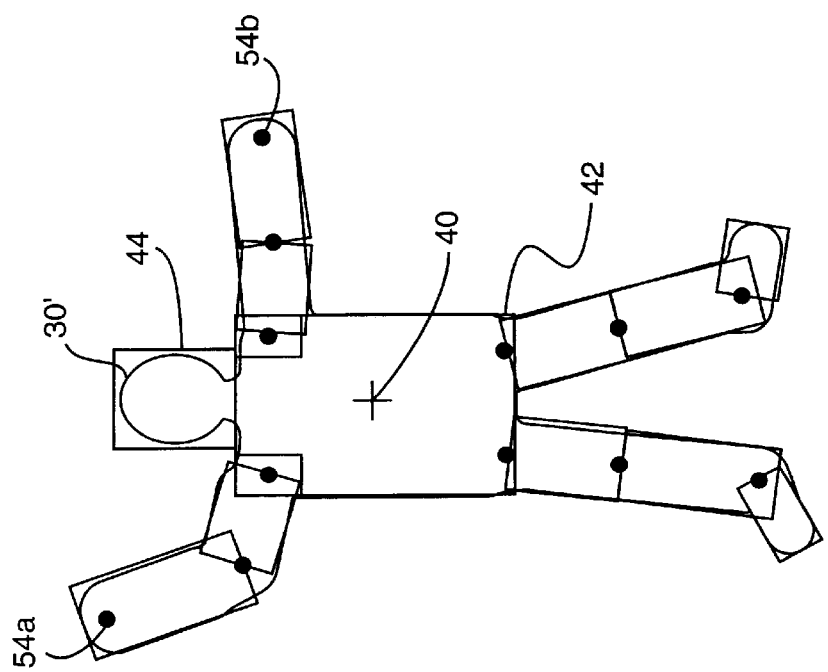
FIG. 6 illustrates an alpha image of the subject of FIG. 3 with reference points and boxes, in accordance with one embodiment of the present invention.

In order to properly allow subject 30 to interact with computer vision system 26, the location and position of the subject must be extracted from the image. FIG. 6 illustrates an alpha image 30' of subject 30 of FIG. 3 with reference points and boxes. In one embodiment, alpha image 30' may be extracted from the image 31 by subtracting out background 28.

A method of subtracting out background 28 in order to provide subject image 30' is disclosed in co-pending applications: U.S. patent application Ser. No. 08/951,089, entitled "METHOD AND APPARATUS FOR MODEL-BASED COMPOSITING", filed concurrently herewith; and U.S. patent application Ser. No. 09/174,491, entitled "METHOD AND APPARATUS FOR PERFORMING A CLEAN BACKGROUND SUBTRACTION", filed concurrently herewith, which are incorporated herein by reference in their entirety. Generally, the method of background subtraction disclosed in provides subject alpha image 30'. Alpha image 30' is typically made up of points or pixels representing the position and location of object 30 within electronic image 31.

A method of adding reference points (including center of body point 40 and hand points 55a and 55b) and reference boxes (including body box 42 and head box 44) to alpha image 30' is disclosed in co-pending U.S. patent application Ser. No. 08/950,404, entitled "A COMPUTER VISION SYSTEM FOR SUBJECT CHARACTERIZATION". Typically, reference points 40, 54a and 54b and reference boxes 42 and 44 indicate the position of certain points or parts of subject image 30" within electronic image 31, representing the position and location of subject 30 in real space.

Figure 7:
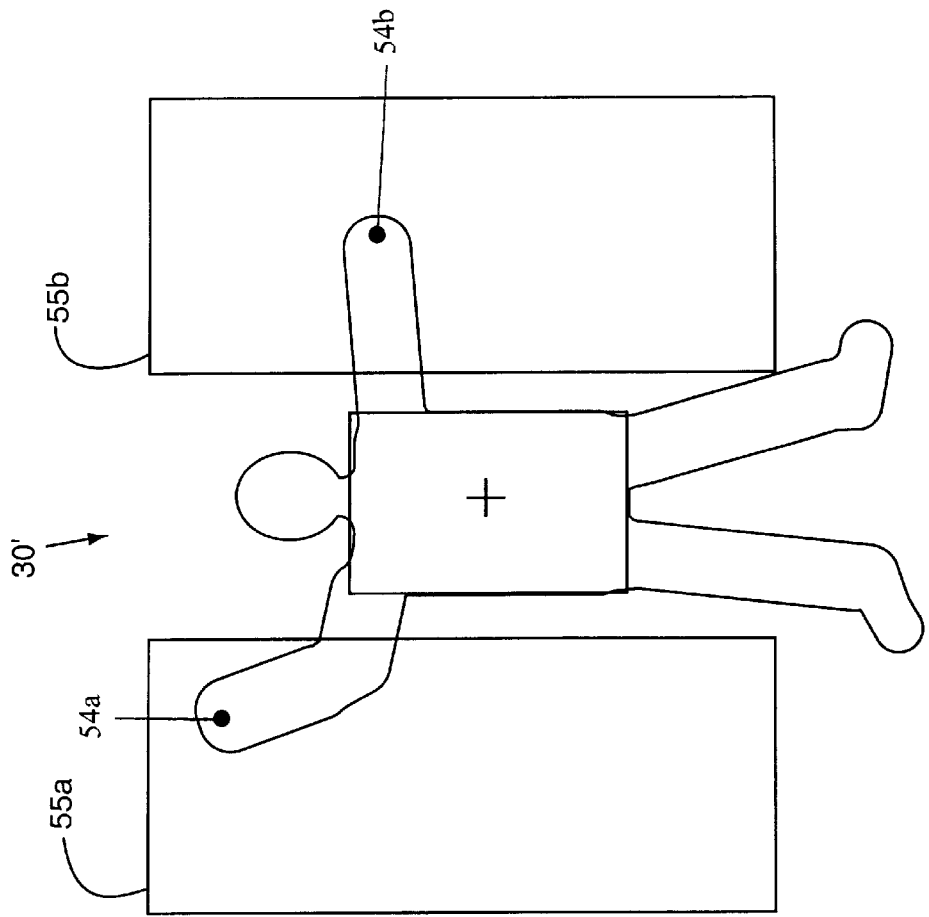
FIG. 7 illustrates the alpha image of FIG. 6 with superimposed hot boxes, in accordance with one embodiment of the present invention.

After obtaining alpha image 30' and the relevant reference points and boxes, computer vision system 26 typically super-imposes hot boxes, or control boxes, to provide interactive regions. FIG. 7 illustrates the alpha image 30' of FIG. 6 with super-imposed hot boxes 55a and 55b. Computer vision system utilizes hot boxes 55a and 55b to determine what actions of subject 30 will trigger an interactive response. Hot boxes 55a and 55b may be of any suitable size and shape, and may be located anywhere within electronic image 31.

In one embodiment, hot boxes 55a and 55b are located within the arm span of alpha image 30'. Hand reference points 54a and 54b may be utilized to determine the type of interaction between subject 30 and electronic image 31.

Figure 8:
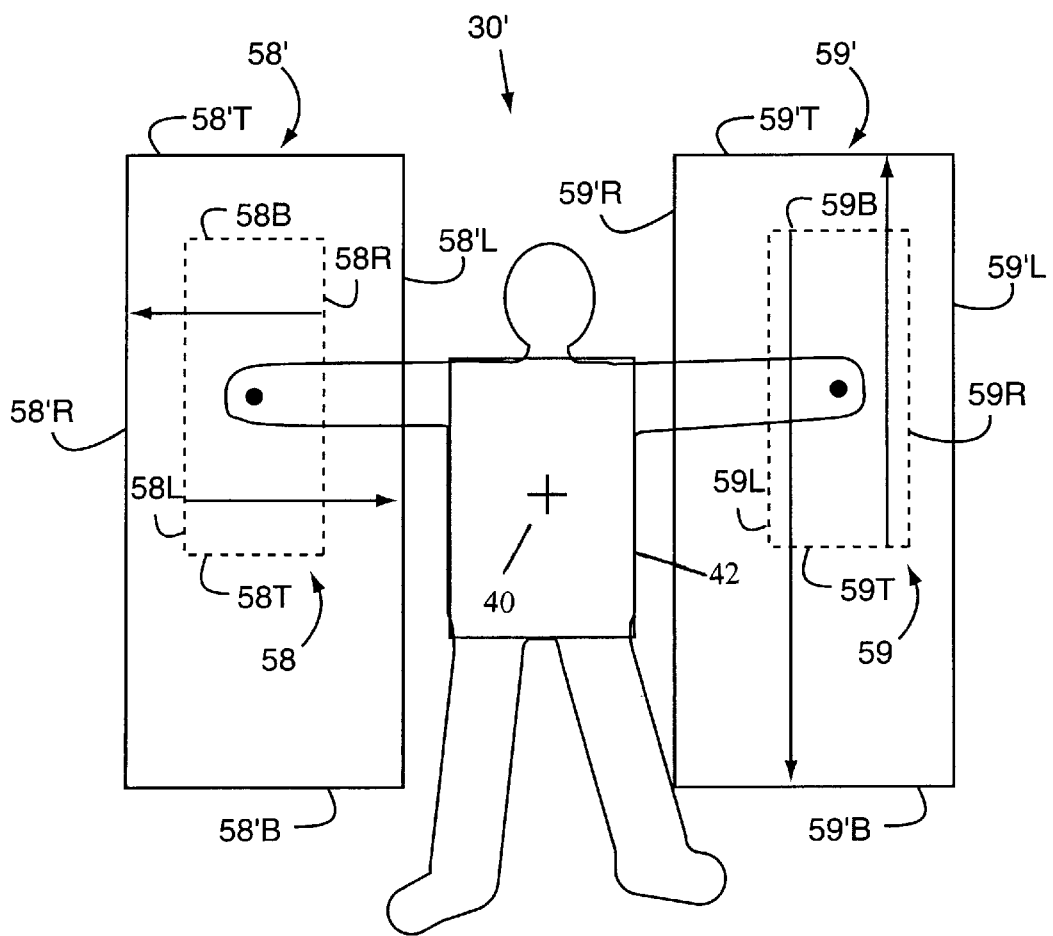
FIG. 8 illustrates the alpha image of FIG. 7 with variable hot boxes, in accordance with another embodiment of the present invention.

In another embodiment, hot boxes 55a and 55b may be interactively created by computer vision system 26 to correspond to subject 30. FIG. 8 illustrates the alpha image of FIG. 7 with variable hot boxes 58 and 59. Due to the different sizes and shapes of all the potential subjects that may interact with computer vision system 26 a method and system of creating variable hot boxes provides added flexibility to the present invention.

In an exemplary embodiment, subject 30 may be requested to stretch out his arms such that hand points 54a and 54b may be located in the center of variable hot boxes 58 and 59. Hot boxes 58 and 59 may have left, right, top and bottom dimensions 58L, 59L, 58R, 59R, 58T, 59T, 58B and 59B. Initially, the dimensions of variable hot boxes 58 and 59 are transposed. For purposes of clarity, the designations "left" and "right" are in reference to subject 30's perspective. A typical hot box would have a right side located to the right of alpha images' right hand point 54a. However, right variable hot box 58 has its right side 58R located to the left of right hand point 54a. Similarly, right variable hot box's 58 left side 58L is located to the right of hand point 54a, again, in the perspective of alpha image 30'.

Computer vision system 26 typically makes a determination if right hand point 54a falls within the left of right side 58R and to the right of left side 58L. In general, the initial determination is that hand point 54a does not fall within those conditions. Computer vision system 26 may then start moving sides 58R and 58L in opposite directions until hand point 54a does fall within the bounds of sides 58R and 58L.

In one embodiment, subject 30 may be asked to move his right arm further outward such that hand point 54a is moved to its furthest extent. Then, right side 58R may then be moved out to the new location of hand point 54a, or further to the right of hand point 54a.

Subject 30 may then be asked to move his right arm close to his torso. Hand point 54a will then be located near the torso of alpha image 30'. Computer vision system 26 may then be able to determine the proper location for left side 58L. Thus, the lateral bounds for hot box 58' may be established. A similar process for determining the lateral extents of hot box 59' may be performed utilizing hand point 54b. During the determination of the lateral bounds, the movements of sides 58R and 58L may be performed independently or simultaneously.

The vertical dimensions may be determined by computer vision system 26 in a similar fashion. The top side 59T of variable hot box 59 may initially located below left hand point 54b, and bottom side 59B located above left hand point 54b. Top and bottom sides 59T and 59B may then be moved until hand point 54b falls above bottom side 59B and below top side 59T. Again, sides 59B and 59T may be moved independently to determine the appropriate location of 54b one side at a time, or they may be moved in conjunction with each other.

The vertical bounds of variable hot box 59 may be determined once the vertical location of hand point 54b when subject 30's arms are horizontally outstretched has been obtained. In one embodiment, subject 30 may be asked to move his arms up and down to delimit the upper and lower bounds of his reach. Thus, top and bottom sides will be set to correspond to the furthest reaches of subject 30's arms. Accordingly, hot boxes 58' and 59' may be established for alpha image 30'.

In another embodiment, the dimensions of variable hot boxes 58 and 59 may be determined automatically. After the location of hand points 54a and 54b have been determined in the horizontally outstretched position, hand points 54a and 54b may be used as the center point of variable hot boxes 58 and 59. The characteristics of alpha image 30' may then be used to determine the dimensions of variable hot boxes 58 and 59. By way of example, body box 42 and center of body point 40 may be used to determine the dimensions of hot boxes 58 and 59. The larger the size of body box 42, hot boxes 58 and 59 may be appropriately scaled relative to center of body point 40. However, any suitable reference point or box may be utilized to determine the dimensions of variable hot boxes 58 and 59.

Figure 10B:
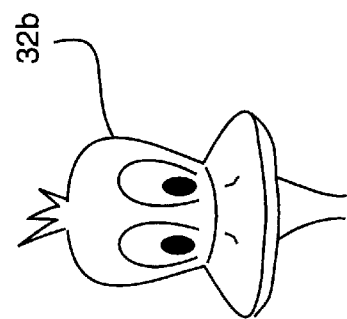
Figure 10A:
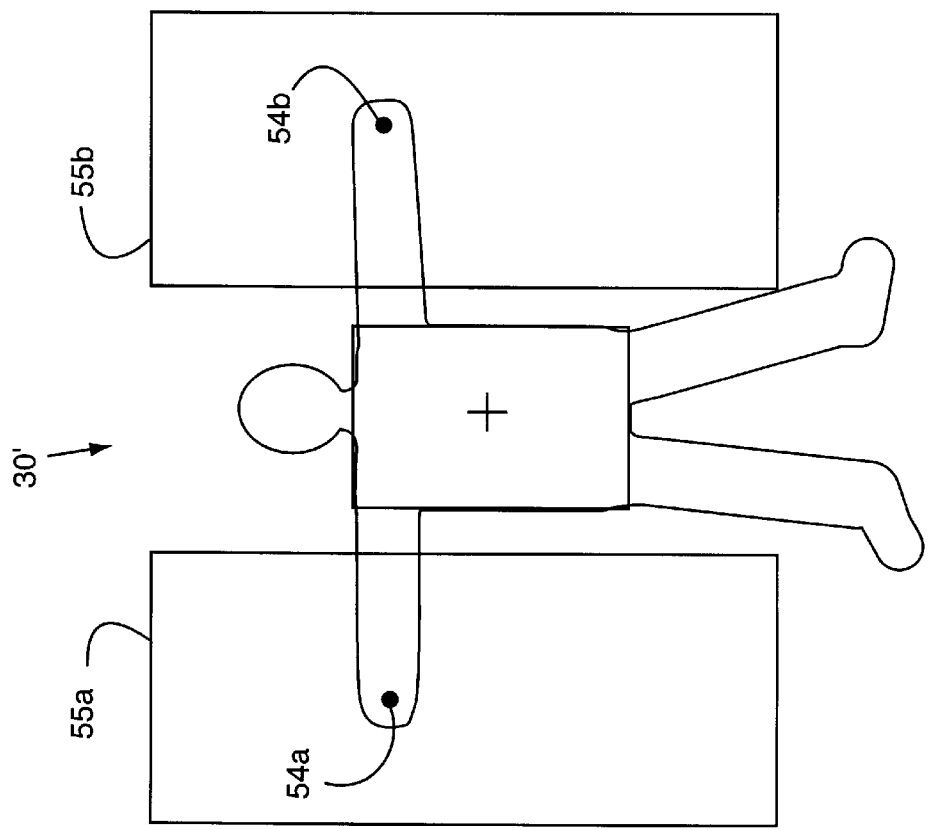
Figure 11B:
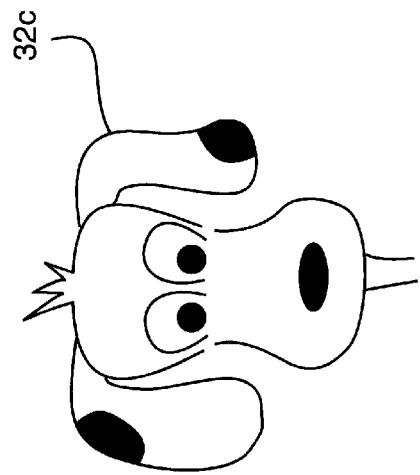
Figure 11A:
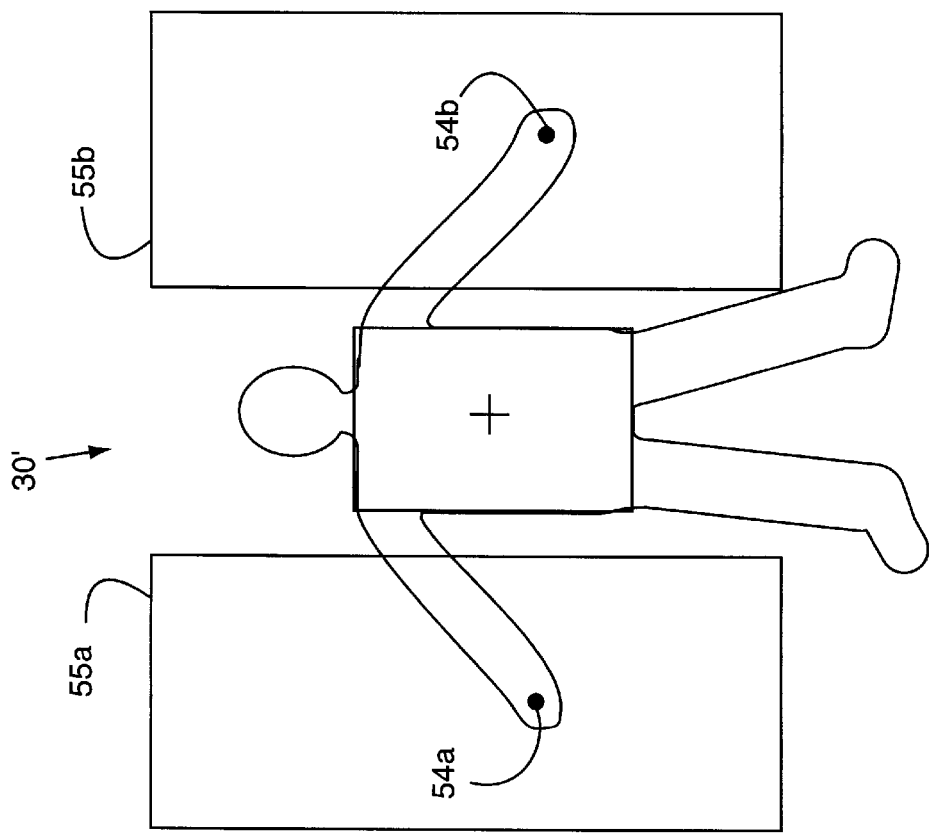

Referring back to FIGS. 4 and 5, the location of hand points 54a and 54b within hot boxes 55a and 55b may be used to control the appearance of cartoon character 32. FIGS. 9a, 9b, 10a, 10b, 11a and 11b illustrate the interactive control of the appearance of cartoon character 32, in accordance with one embodiment of the present invention. FIGS. 9a, 10a, and 11a depict alpha images 30'a–c in different poses. Hand points 54a and 54b are located in different positions of hot boxes 55a and 55b in the different illustrations. FIGS. 9b–11b depict different appearances 32a–32c of cartoon character 32 corresponding to the associated alpha image.

Figure 9B:
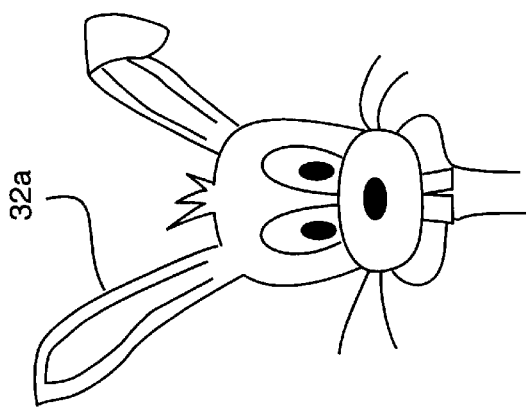
FIGS. 9a, 9b, 10a, 10b, 11a, and 11b illustrate the interactive control of the appearance of a cartoon character, in accordance with one embodiment of the present invention.
Figure 9A:
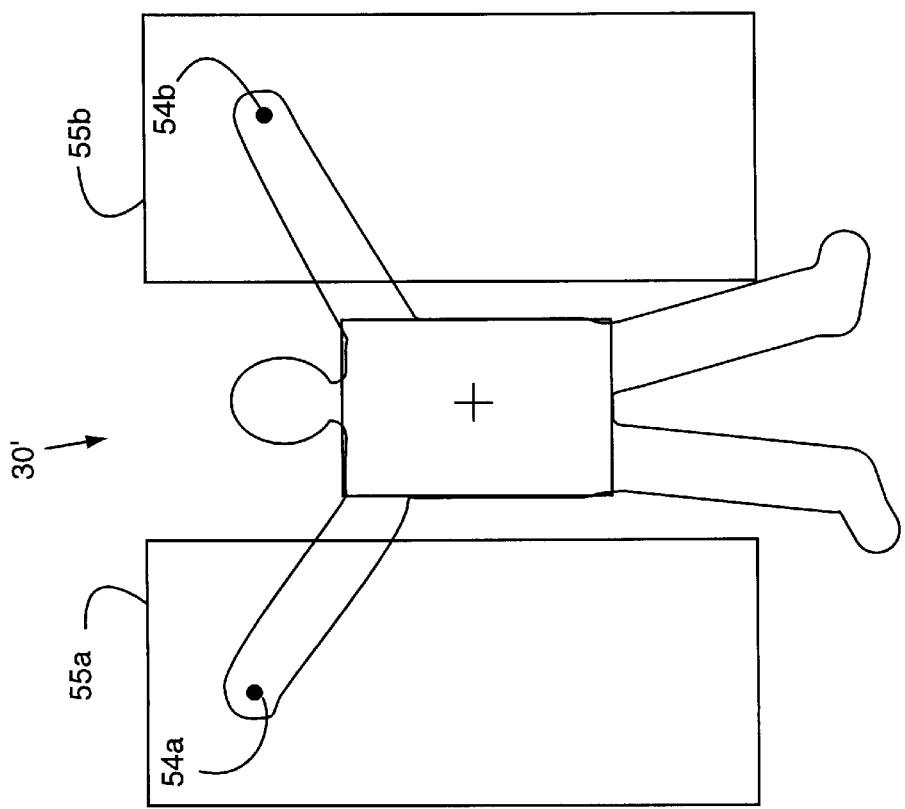

When hand points 54a and 54b are located in the upper third of hot boxes 55a and 55b cartoon character 32 appears as a rabbit 32a, as seen in FIGS. 9a and 9b. If hand points 54a and 54b are located in the center of hot boxes 55a and 55b cartoon character 32 appears as a duck 32b, as seen in FIGS. 10a and 10b. And, cartoon character 32 appears as a dog 32c when hand points 54a and 54b are located in the lower third of hot boxes 55a and 55b. Thus, in the illustrated embodiment, computer vision system is capable of changing the appearance of cartoon character 32 based upon the location of certain reference points relative to a hot box.

In another embodiment, the appearance of cartoon character 32 may be gradually changed between different appearances 32a–32c. By way of example, as hand points 54a and 54b slowly move from the top of hot boxes 55a and 55b towards the center of the hot boxes cartoon character 32 may gradually morph from rabbit 32a to duck 32b. Therefore, the precise location of hand points 54a and 54b may dictate the appearance of cartoon character 32.

In yet another embodiment, movement may be used to control the appearance of cartoon character 32. Rather than using the location of hand points 54a and 54b to determine the appearance of cartoon character 32 the manner in which hand points 54a and 54b have moved around in hot boxes 55a and 55b may serve as an interactive input. Further, any combination of movement, location or other forms of visual, audio, and tactile input may be used as a form of interaction, in accordance with the present invention.

Figure 12:
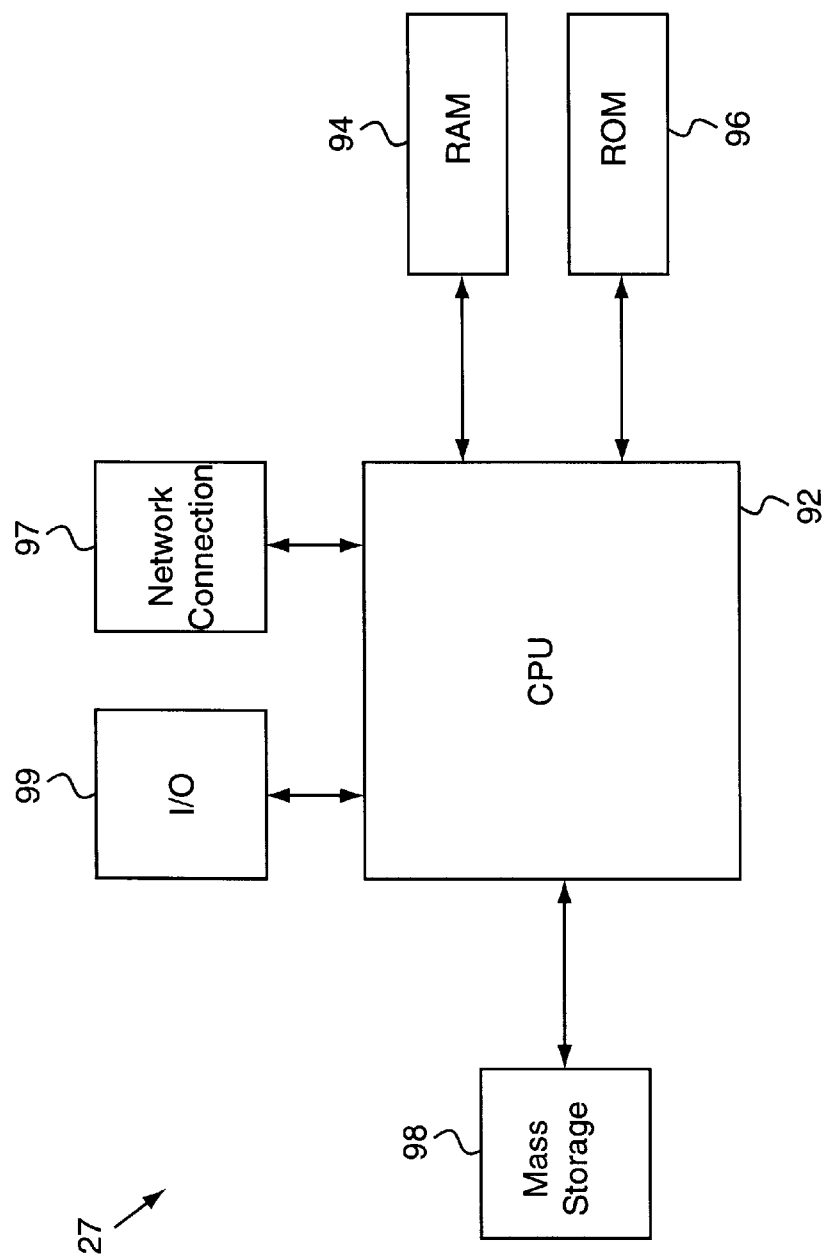
FIG. 12 is a diagrammatic block diagram of a general purpose computer system suitable for implementing the process of one embodiment of the present invention.

FIG. 12 is a schematic illustration of a general purpose computer system suitable for implementing the process of the present invention and form the basis for computer vision system 26, in one embodiment. The computer system includes a central processing unit (CPU) 92, which CPU is coupled bi-directionally with random access memory (RAM) 94 and unidirectionally with read only memory (ROM) 96. Typically RAM 94 includes programming instructions and data, including text objects as described herein in addition to other data and instructions for processes currently operating on CPU 92.

ROM 96 typically includes basic operating instructions, data and objects used by the computer to perform its functions. In addition, a mass storage device 98, such as a hard disk, CD ROM, magneto-optical (floptical) drive, tape drive or the like, is coupled bi-directionally with CPU 92. Mass storage device 98 generally includes additional programming instructions, data and text objects that typically are not in active use by the CPU, although the address space may be accessed by the CPU, e.g., for virtual memory or the like.

In one embodiment of the present invention, the operations of computer vision system 26 may be stored on a computer readable medium. The stored operations may then be implemented on computer 27. Computer readable medium may be a suitable medium capable of holding information that may be transferred to a computing device. By way of example, computer readable medium may be a floppy disk, a memory chip, a CD ROM, a floptical disk, a tape, a DVD disk, a hard disk, a memory source coupled to computer system 27 through a network or any other suitable medium.

Each of the above described computers further includes an input/output source 99 that typically includes input media such as a keyboard, a monitor, pointer devices (e.g., a mouse or stylus), a camera, a scanner, and the like. Each computer may also include a network connection 97 over which data, including, e.g., text objects, and instructions can be transferred. Additional mass storage devices (not shown) may also be connected to CPU 92 through network connection 97. It will be appreciated by those skilled in the art that the above described hardware and software elements are of standard design and construction.

Figure 13:
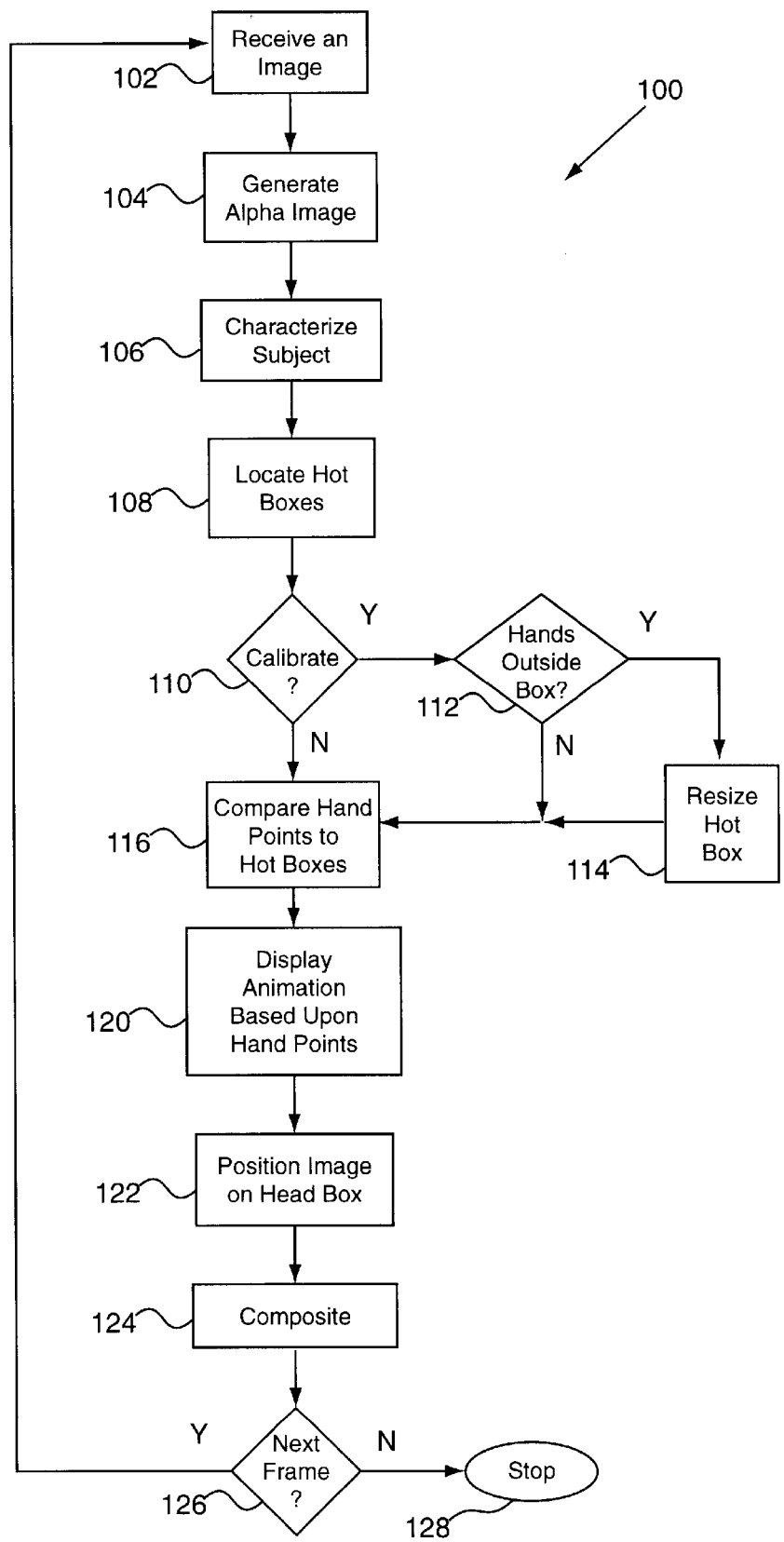
FIG. 13 is a diagrammatic flowchart of the operation of a computer vision system, in accordance with one embodiment of the present invention.

FIG. 13 is a diagrammatic flowchart 100 of the operation of computer vision system 26, in accordance with one embodiment of the present invention. Initially computer vision system 26 obtains an electronic image of a real image, including a subject, in block 102. Any suitable method of obtaining an electronic image of a real life image may be used in accordance with the present invention. By way of example, a discrete digital camera, a digital video camera, an analog camera in combination with a digital to analog converter, scanner, infra-red camera, radar or sonar may be utilized. Alternatively, the electronic images may be stored on a computer readable medium in, by way of example, a library of images that were previously obtained.

After an electronic image of the real life image is taken, the electronic image of the subject is extracted from the entire electronic image. In block 104 computer vision system 26 extracts an alpha image of the subject. Typically, the alpha image is a representation of the pixels or points occupied by the subject image within the electronic image.

In block 106 computer vision system 26 characterizes the alpha image. The characterization process determines the relative positions of various parts or points of the subject, represented as reference points and boxes. In one embodiment, the subject is a human being and hand points 54a and 54b, body box 42, head box 44 and center of body point 40 are the reference points and boxes that are obtained.

Once the alpha image is fully characterized, computer vision system 26 determines where to locate hot boxes relative to the alpha image in block 108. Hot boxes may be of any suitable size, shape and number, and may be located anywhere within the electronic image. In one embodiment, hot boxes 55a and 55b are located to the side of the human subject.

In block 110, computer vision system 26 determines whether calibration is necessary. In one embodiment, the mode of calibration may be set manually. By way of example, when a subject is first beginning to interact with computer vision system 26, an operator may initiate calibration such that computer vision system 26 may better recognize the poses of the subject.

If calibration is necessary, computer vision system 26 proceeds from block 110 to block 112. In block 112 it is determined whether the appropriate reference points or boxes are located within the appropriate hot box. In the exemplary embodiment, computer vision system 26 determines if hand points 54a and 54b are located within hot boxes 55a and 55b, respectively.

If it is determined that hand points 54a and 54b are not located within hot boxes 55a and/or 55b, computer vision system 26 proceeds to resize hot boxes 55a and/or 55b in block 114. The process of resizing hot boxes was discussed in further detail above with reference to FIG. 8, above. In one embodiment, hot boxes 55a and 55b are resized such that hand points 54a and 54b are located within the hot boxes. The resizing of hot boxes 55a and 55b may also be relative to body box 42 and center of body point 40.

Once hot boxes 55a and 55b are appropriately sized, computer vision system 26 has been calibrated. In block 116 the location of hand points 54a and 54b during normal movement is determined relative to hot boxes 55a and 55b. In block 120, computer vision system 26 interacts with the pose of the subject. In one embodiment, a cartoon character 32 is controlled by the position of hand points 54a and 54b.

Cartoon character 32 is merely illustrative of any type of visual, aural or tactile feedback that may be provided by computer vision system 26 as the form of interaction between the subject and the computer vision system. In one embodiment, the positions of hand points 54a and 54b may be correlated with a particular appearance of cartoon character 32. By way of example, a lookup table may be used to display the appropriate appearance. In another embodiment, the positions of hand points 54a and 54b may be provided as inputs to a "morpher." The morpher may then morph between any two or more images of cartoon character 32 depending upon the positions of hand points 54a and 54b.

In one embodiment, computer vision system 26 may place cartoon character 32 on the electronic image of the subject. By placing cartoon character 32 on the electronic image of the subject based upon the location of head box 44 on the alpha image, the electronic image of the subject will appear to have a cartoon character 32 head. In block 124, computer vision system 26 composites all the different aspects of the final electronic image. The electronic image of the background, the electronic image of the subject, and cartoon character 32 are combined using the information discerned from the alpha image and the reference points and boxes.

In another embodiment, cartoon character 32 is composited with electronic image 10, including subject image 30". Cartoon character 32 then appears as part of electronic image 10. Further, subject 30 is capable of interacting with subject image 30" and cartoon character 32 by viewing electronic image 10.

The above procedures are typically done on a per frame basis, thereby allowing for real-time interaction between the subject and the computer vision system. After the current frame has been properly processed, computer vision system 26 determines if there are further frames to be processed, in block 126. If more frames are being taken by computer vision system 26 the procedure returns to block 102. If the interaction between the subject and the computer vision system is over, then operations end in block 128.

In another embodiment, computer vision system 26 may automatically initiate calibration if the subject is not initially recognized. Recognition may be a function of the reference points and boxes obtained in block 106. Alternatively, if hand points 54a and 54b are not initially found within hot boxes 55a and 55b, respectively, calibration may be initiated.

As disclosed, the present invention is capable of providing real time interaction between a subject and a computer system. The interaction, by way of the computer system, may be extended to other machines, mechanisms, displays or other suitable forms of expression. Additionally, real time interaction is possible in accordance with one aspect of the present invention due to the simplified methods of characterization and interaction. The present invention also provides for real time interaction with a standard computer system, rather than large mainframes or supercomputers.

Although the foregoing invention has been described in some detail for purposes of clarity of understanding, it will be apparent that certain changes and modifications may be practiced within the scope of the appended claims. By way of example, a computer vision system in accordance with the present invention may be utilized for pattern recognition purposes, manufacturing quality control, motion analysis and security or any other suitable purpose.

Furthermore, it should be noted that there are alternative ways of implementing both the method and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer-implemented system for digitally compositing a sub-image onto a destination image comprising:

an alpha image generator for creating an alpha image of a sub-image from an input image, wherein the alpha image generator separates the sub-image from a background of the input image and providing the alpha image; and a characterizer for determining a first characteristic of the alpha image, the first characteristic being further descriptive of the sub-image;

a comparator for comparing the first characteristic with a control box applied to the input image, such that the systems responds to the first characteristic based upon a correlation between the first characteristic and the control box; and an image blender for blending the sub-image in the input image that contains the sub-image onto a destination image using said alpha image, thereby compositing said sub-image and the characteristic of the sub-image onto said destination image.

2. A system as recited in claim 1, wherein the alpha image is a plurality of pixels representing the sub-image.

3. A system as recited in claim 1 further comprising an image transformer for transforming the alpha image before compositing the sub-image onto the destination image.

4. A computer-implemented system for interaction between a subject and an electronic image, the system comprising:

an image capturing device, the image capturing device generating an electronic image of a scene, the scene including the subject, whereby an electronic subject image is part of the electronic image of the scene; and a computing device, the computing device determining a characteristic of the electronic subject image indicative of the subject, wherein the subject interacts with the system by varying the characteristic.

5. A system as recited in claim 4, the system further comprising an electronic display, wherein the electronic display displays the electronic image and the subject interacts with the electronic image by varying the characteristic.

6. A system as recited in claim 4, wherein the computing device compares the characteristic with a hot box such that the interaction between the system and the subject is determined by the characteristic and the hot box.

7. A system as recited in claim 6, wherein the computing device compares the characteristic with a hot box such that the interaction between the system and the subject is determined by the characteristic and the hot box, and the system further comprising an electronic display, wherein the electronic display displays the electronic image and the hot box such that the subject interacts with the electronic image by varying the characteristic in relation to the hot box.

8. A system as recited in claim 6, wherein the hot box is varied to conform to the subject to allow interaction between the subject and the system.

9. A system as recited in claim 6, wherein the subject interacts with the system in real time.

10. A computer implemented system for permitting a subject to interact with an electronic image, wherein a characteristic of the subject is determined and compared against a control box such that the interaction between the subject and the electronic image is controlled by the correlation between the characteristic and the control box.

11. A computer implemented method for generating an electronic image that interacts with a subject, the method comprising:

electronically imaging a scene including a subject, wherein the electronic image of the scene and an alpha image of the subject is created;

determining a first characteristic of the subject from the alpha image, the first characteristic being indicative of the subject;

comparing the first characteristic with a control box applied to the electronic image, wherein the subject interacts with the electronic image by changing the first characteristic.

12. A computer implemented method for generating an electronic image that interacts with a subject, the method comprising:

electronically imaging a scene including a subject, whereby an electronic image of the scene and an alpha image of the subject is created, wherein the alpha image is comprised of a plurality of pixels;

determining a first characteristic of the subject from the alpha image, the first characteristic being indicative of the subject;

applying a control box to the electronic image;

displaying a destination image, the destination image including the electronic image, a subject image that is a representation of the subject and the control box, such that the subject may visually interact with the destination image by varying the first characteristic of the subject in relation to the control box.

13. A computer-implemented digital video method for generating an electronic image that interacts with a subject, the method comprising:

creating a background model by examining a plurality of frames of an average background image;

obtaining a frame of an input image that contains a subject to be characterized;

creating an alpha image such that a value of each pixel in the alpha image is set according to a value corresponding to a pixel from the input image and a value corresponding to a pixel from the average background image;

deriving a set of templates such that the set of templates comprises the shape of the subject being characterized;

setting the values of pixels in the alpha image according to the set of templates such that portions of the alpha image contained within the templates are adjusted so that the pixels do not represent holes in the subject;

deriving a first characteristic of the subject from a selected one of the set of templates of the alpha image;

comparing the first characteristic with a control box, wherein the subject interacts with the electronic image by changing the first characteristic; and blending the subject in the input image onto the destination image.

14. A computer readable medium including a computer readable code device configuring a computer to function as the computing device as recited in claim 1.

15. A computer readable medium including a computer readable code device configuring a computer to perform a method as recited in claim 11.

* * * * *

UNITED STATES PATENT AND TRADEMARK OFFICE
CERTIFICATE OF CORRECTION

PATENT NO.   : 6,130,677
DATED        : October 10, 2000
INVENTOR(S)  : Andrew Kunz It is certified that error appears in the above-identified patent and that said Letters Patent is hereby corrected as shown below:

<u>Column 1,</u>
Line 6, reads "U.S. patent application Ser. No. 08/951,889, entitled" it should read
-- U.S. patent application Ser. No. 08/951,089, entitled --;
Line 15, reads "904, entitled "A COMPUTER VISION SYSTEM FOR" it should read
-- 404, entitled "A COMPUTER VISION SYSTEM FOR --;

<u>Column 2,</u>
Line 3, reads "be may be manipulated by subject 4 through movement." it should read
-- be manipulated by subject 4 through movement. --;

<u>Column 3,</u>
Line 14, reads "utilize markers or pretraining may not capable of real time-" it should
read -- utilize markers or pretraining may not be capable of real time --;

<u>Column 5,</u>
Line 29, reads "ground 28 which, may have been captured along with" it should read
-- ground 25, which may have been captured along with --;

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,130,677
DATED        : October 10, 2000
INVENTOR(S)  : Andrew Kunz It is certified that error appears in the above-identified patent and that said Letters Patent is hereby corrected as shown below:

<u>Title page,</u>
Before item [56], References Cited, insert the following:
--                 Related U.S. Application Data
[63] Claims the benefit of application No. 08/950,404,
October 15, 1997; application No. 08/951,089, October 15, 1997; and provisional application No. 60/062,068, October 15, 1997 --;

U.S. PATENT DOCUMENTS, add:
-- 5,623,587      4/1997   Bulman ...........345/435 --;

OTHER PUBLICATIONS, add:
-- "3DK: The Virtual Studio" (GMD Demo Nov. 24, 1994) --;

Signed and Sealed this

Fifth Day of August, 2003

JAMES E. ROGAN
*Director of the United States Patent and Trademark Office*